United States Patent
Nugent

(10) Patent No.: US 10,049,321 B2
(45) Date of Patent: Aug. 14, 2018

(54) ANTI-HEBBIAN AND HEBBIAN COMPUTING WITH THERMODYNAMIC RAM

(71) Applicant: KnowmTech, LLC, Albuquerque, NM (US)

(72) Inventor: Alex Nugent, Santa Fe, NM (US)

(73) Assignee: KNOWMTECH, LLC, Santa Fe, NM (US)

(*) Notice: Subject to any disclaimer, the term of this patent is extended or adjusted under 35 U.S.C. 154(b) by 637 days.

(21) Appl. No.: 14/674,428

(22) Filed: Mar. 31, 2015

(65) Prior Publication Data
US 2015/0286926 A1    Oct. 8, 2015

Related U.S. Application Data

(60) Provisional application No. 61/975,028, filed on Apr. 4, 2014.

(51) Int. Cl.
| | |
|---|---|
| *H04L 12/28* | (2006.01) |
| *G06N 3/04* | (2006.01) |
| *G06N 3/063* | (2006.01) |
| *G06N 99/00* | (2010.01) |

(52) U.S. Cl.
CPC ............ *G06N 3/049* (2013.01); *G06N 3/063* (2013.01); *G06N 99/005* (2013.01)

(58) Field of Classification Search
CPC .......... G06N 3/08; G06N 3/049; G06N 3/063; G06N 3/005
USPC ....................................................... 370/255
See application file for complete search history.

(56) References Cited

U.S. PATENT DOCUMENTS

| | | | |
|---|---|---|---|
| 6,889,216 B2 | 5/2005 | Nugent |
| 6,995,649 B2 | 2/2006 | Nugent |
| 7,028,017 B2 | 4/2006 | Nugent |
| 7,039,619 B2 | 5/2006 | Nugent |
| 7,107,252 B2 | 9/2006 | Nugent |
| 7,392,230 B2 | 6/2008 | Nugent |
| 7,398,259 B2 | 7/2008 | Nugent |
| 7,409,375 B2 | 8/2008 | Nugent |
| 7,412,428 B2 | 8/2008 | Nugent |
| 7,420,396 B2 | 9/2008 | Nugent |
| 7,426,501 B2 | 9/2008 | Nugent |
| 7,502,769 B2 | 3/2009 | Nugent |
| 7,599,895 B2 | 10/2009 | Nugent |
| 7,752,151 B2 | 7/2010 | Nugent |
| 7,827,130 B2 | 11/2010 | Nugent |

(Continued)

*Primary Examiner* — Vongsavanh Sengdara
(74) *Attorney, Agent, or Firm* — Kermit D. Lopez; Luis M. Ortiz; Ortiz & Lopez, PLLC

(57) ABSTRACT

A thermodynamic RAM circuit composed of a group of AHaH (Anti-Hebbian and Hebbian) computing circuits that form one or more kT-RAM circuits. The AHaH computing circuits can be configured as an AHaH computing stack. The kTRAM circuit(s) can include one or core kT-Cores, each partitioned into AHaH nodes of any size via time multiplexing. The kT-Core couples readout electrodes together to form a larger combined kT-Core. AHaH Computing is the theoretical space encompassing the capabilities of AHaH nodes. At this level of development, solutions have been found for problems as diverse as classification, prediction, anomaly detection, clustering, feature learning, actuation, combinatorial optimization, and universal logic.

17 Claims, 7 Drawing Sheets

(56) References Cited

U.S. PATENT DOCUMENTS

| | | |
|---|---|---|
| 7,827,131 B2 | 11/2010 | Nugent |
| 7,930,257 B2 | 4/2011 | Nugent |
| 8,022,732 B2 | 9/2011 | Nugent |
| 8,041,653 B2 | 10/2011 | Nugent |
| 8,156,057 B2 | 4/2012 | Nugent |
| 8,311,958 B2 | 11/2012 | Nugent |
| 8,332,339 B2 | 12/2012 | Nugent |
| 8,781,983 B2 | 7/2014 | Nugent |
| 8,909,580 B2 | 12/2014 | Nugent |
| 8,918,353 B2 | 12/2014 | Nugent |
| 8,972,316 B2 | 3/2015 | Nugent |
| 8,983,886 B2 | 3/2015 | Nugent |
| 8,990,136 B2 | 3/2015 | Nugent |
| 9,099,179 B2 | 8/2015 | Nugent |
| 9,104,975 B2 | 8/2015 | Nugent |
| 2003/0177450 A1 | 9/2003 | Nugent |
| 2003/0236760 A1 | 12/2003 | Nugent |
| 2004/0039717 A1 | 2/2004 | Nugent |
| 2004/0153426 A1 | 8/2004 | Nugent |
| 2004/0162796 A1 | 8/2004 | Nugent |
| 2004/0193558 A1 | 9/2004 | Nugent |
| 2005/0015351 A1 | 1/2005 | Nugent |
| 2005/0149464 A1 | 7/2005 | Nugent |
| 2005/0149465 A1 | 7/2005 | Nugent |
| 2005/0151615 A1 | 7/2005 | Nugent |
| 2005/0256816 A1 | 11/2005 | Nugent |
| 2006/0036559 A1 | 2/2006 | Nugent |
| 2006/0184466 A1 | 8/2006 | Nugent |
| 2007/0005532 A1 | 1/2007 | Nugent |
| 2007/0022064 A1 | 1/2007 | Nugent |
| 2007/0176643 A1 | 8/2007 | Nugent |
| 2008/0258773 A1 | 10/2008 | Nugent |
| 2009/0043722 A1 | 2/2009 | Nugent |
| 2009/0138419 A1 | 5/2009 | Nugent |
| 2009/0228415 A1 | 9/2009 | Nugent |
| 2009/0228416 A1 | 9/2009 | Nugent |
| 2010/0280982 A1 | 11/2010 | Nugent |
| 2010/0287124 A1 | 11/2010 | Nugent |
| 2011/0031999 A1* | 2/2011 | Beat .................. H03K 19/17752 326/38 |
| 2011/0145177 A1 | 6/2011 | Nugent |
| 2011/0145179 A1 | 6/2011 | Nugent |
| 2011/0161268 A1 | 6/2011 | Nugent |
| 2011/0302119 A1 | 12/2011 | Nugent |
| 2012/0078827 A1 | 3/2012 | Nugent |
| 2012/0150780 A1 | 6/2012 | Nugent |
| 2012/0175583 A1 | 7/2012 | Nugent |
| 2012/0191438 A1 | 7/2012 | Nugent |
| 2013/0073497 A1* | 3/2013 | Akopyan ................ G06N 3/049 706/27 |
| 2013/0218815 A1 | 8/2013 | Nugent |
| 2013/0258905 A1* | 10/2013 | Nugent .................. G06F 15/16 370/255 |
| 2013/0275358 A1 | 10/2013 | Nugent |
| 2013/0289902 A1 | 10/2013 | Nugent |
| 2014/0006323 A1 | 1/2014 | Nugent |
| 2014/0156576 A1 | 6/2014 | Nugent |
| 2014/0192587 A1 | 7/2014 | Nugent |
| 2015/0019467 A1 | 1/2015 | Nugent |
| 2015/0019468 A1 | 1/2015 | Nugent |
| 2015/0074029 A1 | 3/2015 | Nugent et al. |

* cited by examiner

```
public interface KTRAM extends Serializable {
/**
 * FF:FORWARD-FLOAT
 * FH:FORWARD-HIGH
 * FL:FORWARD-LOW
 * FU:FORWARD-UNSUPERVISED
 * FA:FORWARD-ANTI-UNSUPERVISED
 * FZ:FORWARD-ZERO
 * RF:REVERSE-FLOAT
 * RH:REVERSE-HIGH
 * RL:REVERSE-LOW
 * RU:REVERSE-UNSUPERVISED
 * RA:REVERSE-ANTI-UNSUPERVISED
 * RZ:REVERSE-ZERO NR: NON-ADAPTING READ. This can only be supported by digital ktram emulators
 * XX:Nothing
 * The direction of the applied voltage-->
 * FORWARD: Causes the synaptic channels to move toward saturation in maximally conductive state.
 * REVERSE: Causes the synaptic channels to move toward saturation in minimally conductive state.
 * Feedback Voltage-->
 * FLOAT: no feedback given. Used for read operations.
 * HIGH: Forces Vy to -V, causing next read operation to evaluate HIGHer.
 * LOW: Forces Vy to +V, causing next read operation to evaluate LOWer.
 * UNSUPERVISED: If Vy>=0 during previous read operation, forces Vy to -V, else forces Vy to +V
 * ANTI_UNSUPERVISED: Opposite of UNSUPERVISED
 * ZERO: Sets .Vy to 0 volts.
 *
 * @author alexnugent
 */
public static enum Instruction {
    FF, FH, FL, FU, FA, FZ, RF, RH, RL, RU, RA, RZ, NR, XX
}
```

FIG. 7

ANTI-HEBBIAN AND HEBBIAN COMPUTING WITH THERMODYNAMIC RAM

CROSS-REFERENCE TO PROVISIONAL APPLICATION

This patent application claims priority under 35 U.S.C. 119(e) to U.S. Provisional Patent Application Ser. No. 61/975,028, entitled "AHaH Computing with Thermodynamic RAM," which was filed on Apr. 4, 2014, the disclosure of which is incorporated herein by reference in its entirety.

STATEMENT OF GOVERNMENT RIGHTS

The United States Government has certain rights in this invention pursuant to Contract No. FA8750-13-C-0031 awarded by the United States Air Force

TECHNICAL FIELD

Embodiments are generally related to the field of AHaH (Anti-Hebbian and Hebbian) learning computing-based devices, methods, and systems. Embodiments are additionally related to the field of thermodynamic RAM (Random Access Memory). Embodiments also relate to the field of machine learning.

BACKGROUND OF THE INVENTION

Machine learning (ML) systems are composed of (usually large) numbers of adaptive weights. The goal of ML is to adapt the values of these weights based on exposure to data to optimize a function, for example, temporal prediction, spatial classification, or reward. The foundation objective of ML creates friction with modern methods of computing, since every adaptation event necessarily reduces to a communication procedure between memory and processing resources separated by a distance. The power required to simulate the adaptive network grows impractically large, owing to the tremendous energy consumed shuttling information back and forth.

Nature, on the other hand, does not separate memory and processing. Rather, the act of memory access is the act of computing is the act of adaptation. The memory processing distance goes to zero and power efficiency explodes by factors exceeding a billion.

Modern computing allows us to explore the universe of all possible ways to adapt. Creating intrinsically adaptive hardware implies that we give up this flexibility and rely on just one method. After all, neurobiological researchers have unearthed dozens of plasticity methods in a brain, which would seem to imply that they are all important in some way or another. If we take a step back and look at all of Nature, however, we find that a viable solution is literally all around us in both biological and non-biological systems. The solution is remarkably simple and it is obviously universal.

We find the solution around us in rivers, lightning, and trees, but also deep within us. The air that we breathe is coupled to our blood through thousands of bifurcating channels that form our lungs. Our brain is coupled to our blood through thousands of bifurcating channels that form our circulatory system, and our neurons are coupled to our brain through the thousands of bifurcating channels forming our axons and dendrites. At all scales we see flow systems built of a very simple fractal building block.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for a thermodynamic circuit formed of differential pairs of memristors.

It is another aspect of the disclosed embodiments to provide for a thermodynamic RAM Core comprising collections of differential pairs of memristors.

It is another aspect of the disclosed embodiments to provide a kT-RAM processor composed of one or more core IST-Cores.

It is another aspect of the disclosed embodiments to provide an instruction set for a kT-RAM processor.

It is yet another aspect of the disclosed embodiments to provide for an AHaH technology computing stack.

It is yet another aspect of the disclosed embodiments to provide a specification for a general-purpose adaptive computing resource The aforementioned aspects and other objectives and advantages can now be achieved as described herein. An AHaH (Anti-Hebbian and Hebbian) circuit is disclosed, which includes a collection of differential pairs of memristors. A kT-Core can be implemented, which includes an AHaH Circuit with a RAM interface, and is capable of partitioning via time multiplexing. A kT-RAM processor is composed of a collection of kT-Cores. AHaH Computing is the theoretical space encompassing the capabilities of AHaH nodes, and kT-RAM is a learning processor providing random access to AHaH learning. At this level of development, solutions have been found for problems as diverse as classification, prediction, anomaly detection, clustering, feature learning, actuation, combinatorial optimization, and universal logic.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 7 illustrates a kT-RAM instruction set, in accordance with an alternative embodiment;

DETAILED DESCRIPTION

The particular values and configurations discussed in these non-limiting examples can be varied and are cited merely to illustrate at least one embodiment and are not intended to limit the scope thereof.

Figure 1:
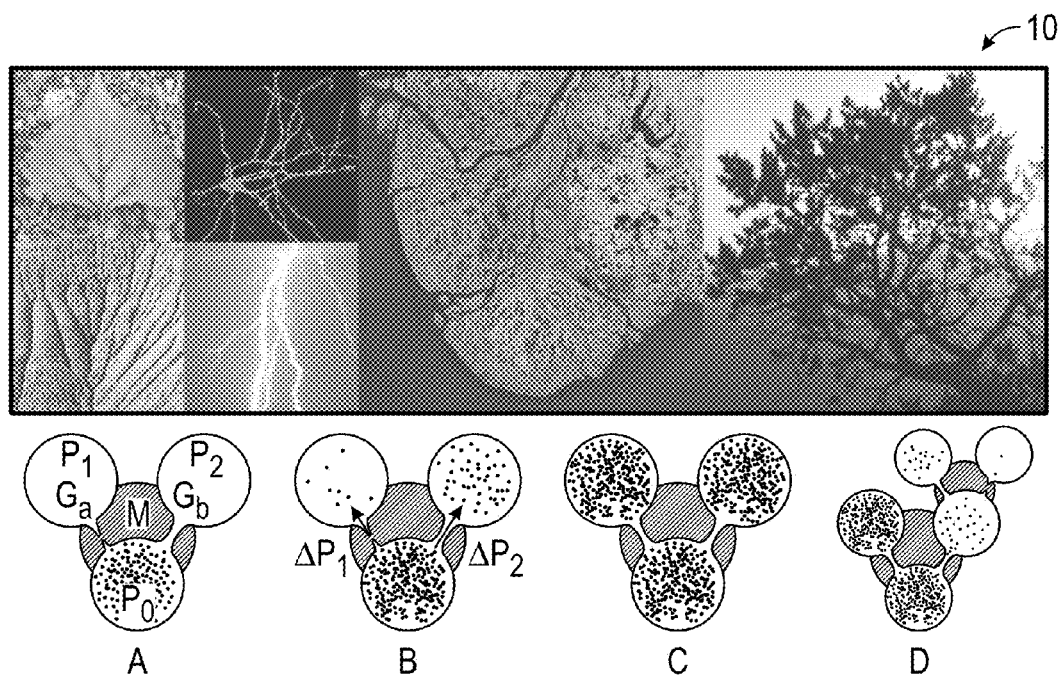
FIG. 1 illustrates a graphic depicting how multiple conduction pathways compete to dissipate energy through a plastic (pliable or adaptive) container, and how the container will adapt in a particular way that leads to the maximization of energy dissipation and Anti-Hebbian and Hebbian (AHaH) plasticity.

FIG. 1 illustrates a graphic 10 depicting how multiple conduction pathways compete to dissipate energy through a plastic (pliable or adaptive) container, and how the container will adapt in a particular way that leads to the maximization of energy dissipation. This mechanism is called the Anti-Hebbian and Hebbian (AHaH) plasticity rule, and is computationally universal and leads to general-purpose solutions to machine learning. Because the AHaH rule is a physical process, we can create extremely efficient and dense AHaH synaptic circuits with memristive components. These circuits form a generic adaptive computing resource we call Thermodynamic Random Access Memory or kT-RAM for brevity.

The kT-RAM approach offers the unique possibility of providing a specification for a general-purpose adaptive computing resource, since the components that it is built from can be rigorously defined and their function abstracted or "black-boxed" at each level of the technology stack. This allows individuals to specialize at one or more levels of the stack. Improvements at various levels of the stack can propagate throughout the whole technology ecosystem, from materials to markets, without any single technology vendor having to bridge the whole stack—a herculean feat that would be close to impossible. The rest of this disclosure outlines the levels of the technology stack needed to support an AHaH Computing industry.

Figure 2:
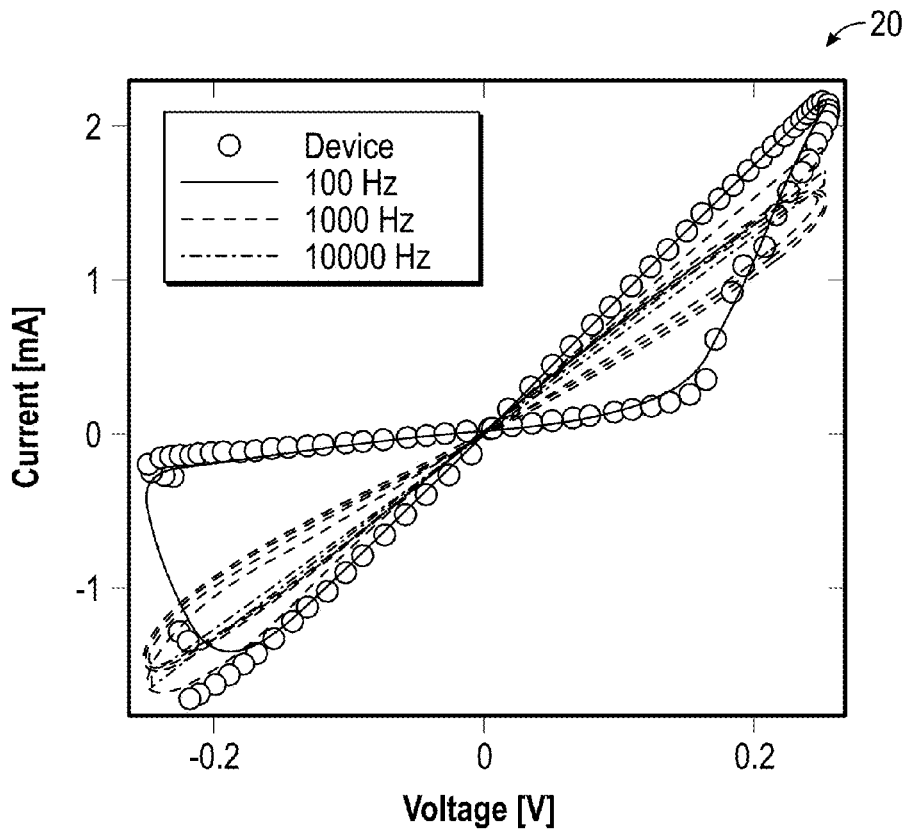
FIG. 2 illustrates a graph depicting a pinched hysteresis loop indicative of a generalized Meta-Stable Switch (MSS) Memristor model.

FIG. 2 illustrates a graph 20 depicting a pinched hysteresis plot indicative of a generalized Meta-Stable Switch (MSS) Memristor model. Many memristive materials have been reported, and it is likely that more will be invented. The generalized Meta-Stable Switch (MSS) Memristor model is an attempt to accurately capture the properties of memristors at a level of abstraction sufficient to enable efficient circuit simulations while describing as wide a range of devices as possible. The MSS model provides a common ground from which a diversity of materials can be compared and incorporated into the technology stack. By modeling a device with the MSS model, a material scientist can evaluate its utility through emulation across domains of machine learning and computing and gain valuable insight into what actually is, and is not, computationally useful.

A Meta Stable Switch (MSS) is an idealized two-state element that switches probabilistically between its two states as a function of applied voltage bias and temperature. A memristor is modeled a collection of MSSs evolving in time. The total current through the device comes from both a memory-dependent current component, $I_m$, and a Schottky diode current, $I_s$, in parallel:

$$I = \phi I_m(V,t) + (1-\phi)I_s(V),$$

where $\phi \in [0,1]$. A value of $\phi=1$ represents a device that contains no diode effects. The MSS model can be made more complex to account for failure modes, for example, by making the MSS state potentials temporally variable. Multiple MSS models with different variable state potentials can be combined in parallel or in series to model increasingly more complex state systems.

Figure 3:
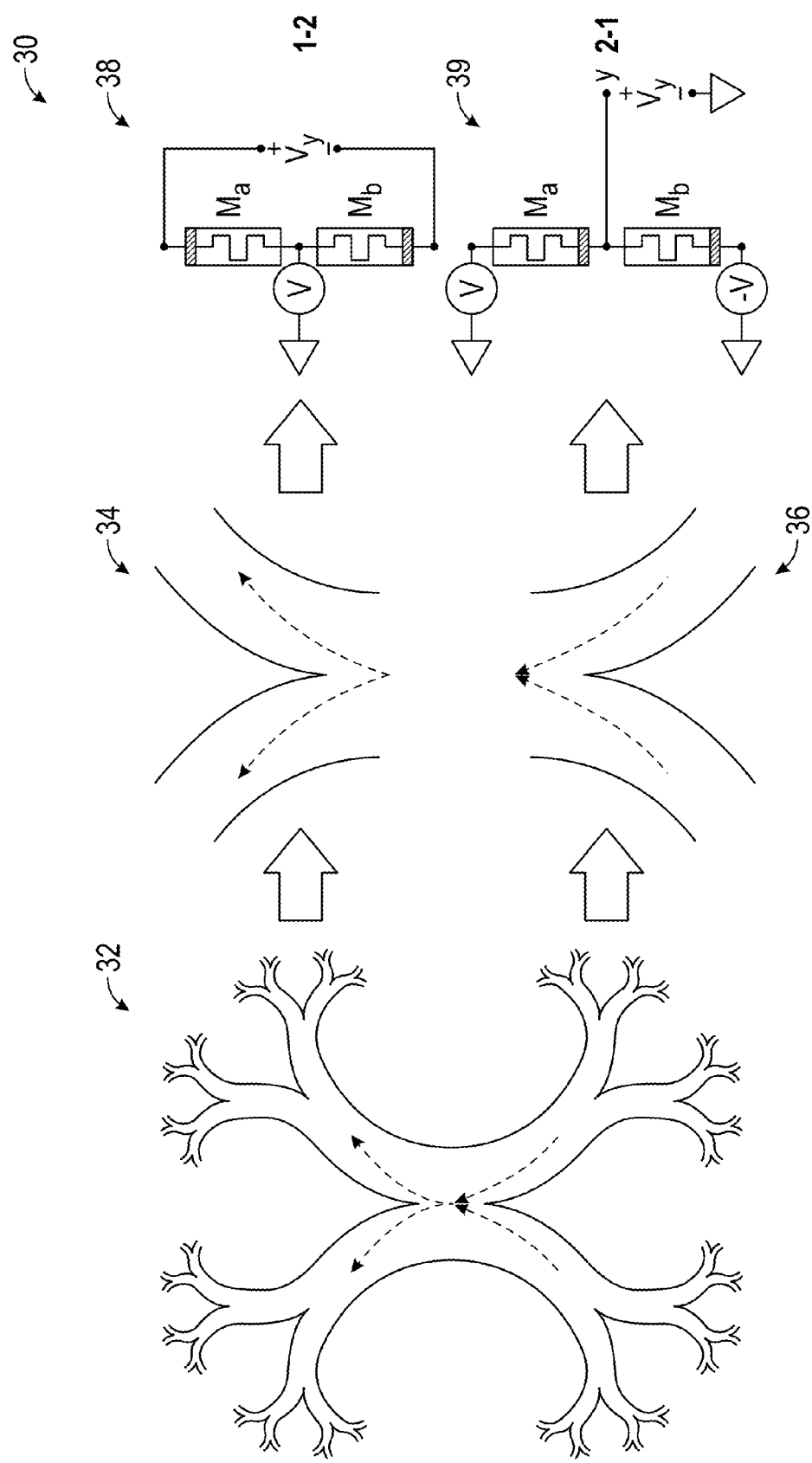
FIG. 3 illustrates a schematic diagram of a memristor as an adaptive energy-dissipating pathway and two competing memristors that form a Thermodynamic Synapse (kT-Synapse), in accordance with a preferred embodiment.

FIG. 3 illustrates a schematic diagram of a memristor circuit 30, in accordance with a preferred embodiment. A memristor is an adaptive energy-dissipating pathway. This is demonstrated by configuration 32, pathways 34, 36, and respective configurations 38, 39 (respectively, 1-2 and 2-1). FIG. 3 illustrates how two competing memristors form a Thermodynamic Synapse (kT-Synapse). kT-synapses come in two configurations, 1-2 and 2-1, depending on the direction of energy flow. When two adaptive energy-dissipating pathways compete for conduction resources, a kT-Synapse will emerge. We see this building block for self-organized structures throughout nature, for example, in arteries, veins, lungs, neurons, leaves, branches, roots, lightning, rivers, and mycelium networks of fungus. We observe that in all cases there is a particle that flows through the assembly that is either directly a carrier of free energy dissipation or else it gates access, like a key to a lock, to free energy dissipation of the units in the collective. Some examples of these particles include water in plants, ATP in cells, blood in bodies, neurotrophins in brains, and money in economies. In memristive electronics, the particle is of course the electron.

Figure 4:
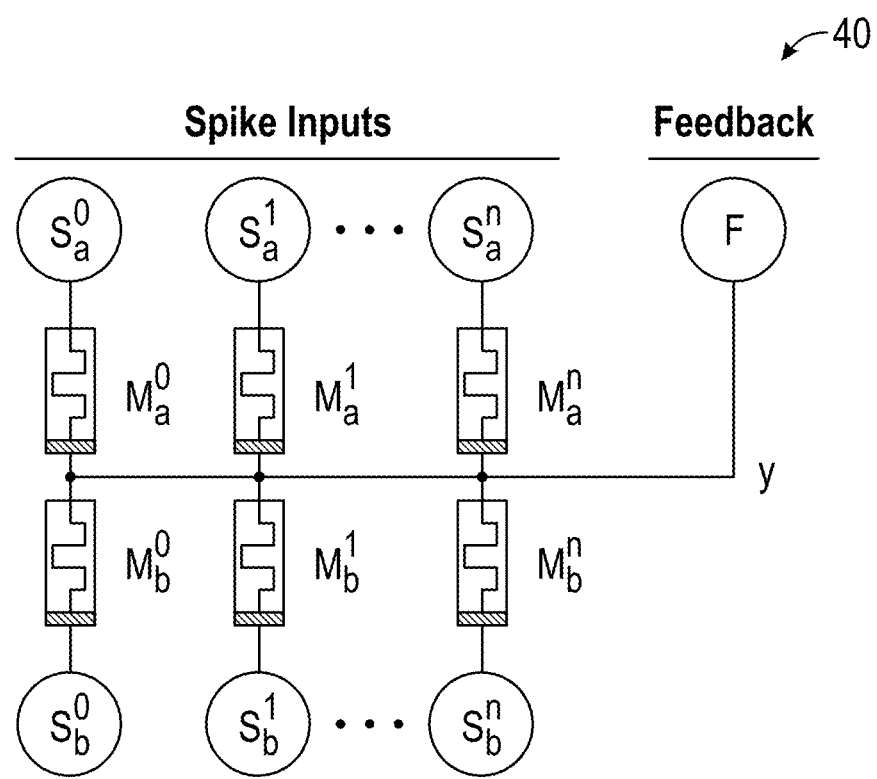
FIG. 4 illustrates a schematic diagram of an AHaH circuit that can be formed when a collective of kT-Synapses are coupled to a common readout line, in accordance with a preferred embodiment.

FIG. 4 illustrates a schematic diagram of an AHaH circuit 40 that can be formed when a collective of kT-Synapses are coupled to a common readout line, in accordance with a preferred embodiment. The AHaH circuit 40 shown in FIG. 4 is formed when a collective of kT-Synapses are coupled to a common readout line. Through spike encoding and temporal multiplexing, an AHaH node is capable of being partitioned into smaller AHaH nodes. An AHaH node circuit provides a simple but universal computational and adaptation resource.

Figure 5:
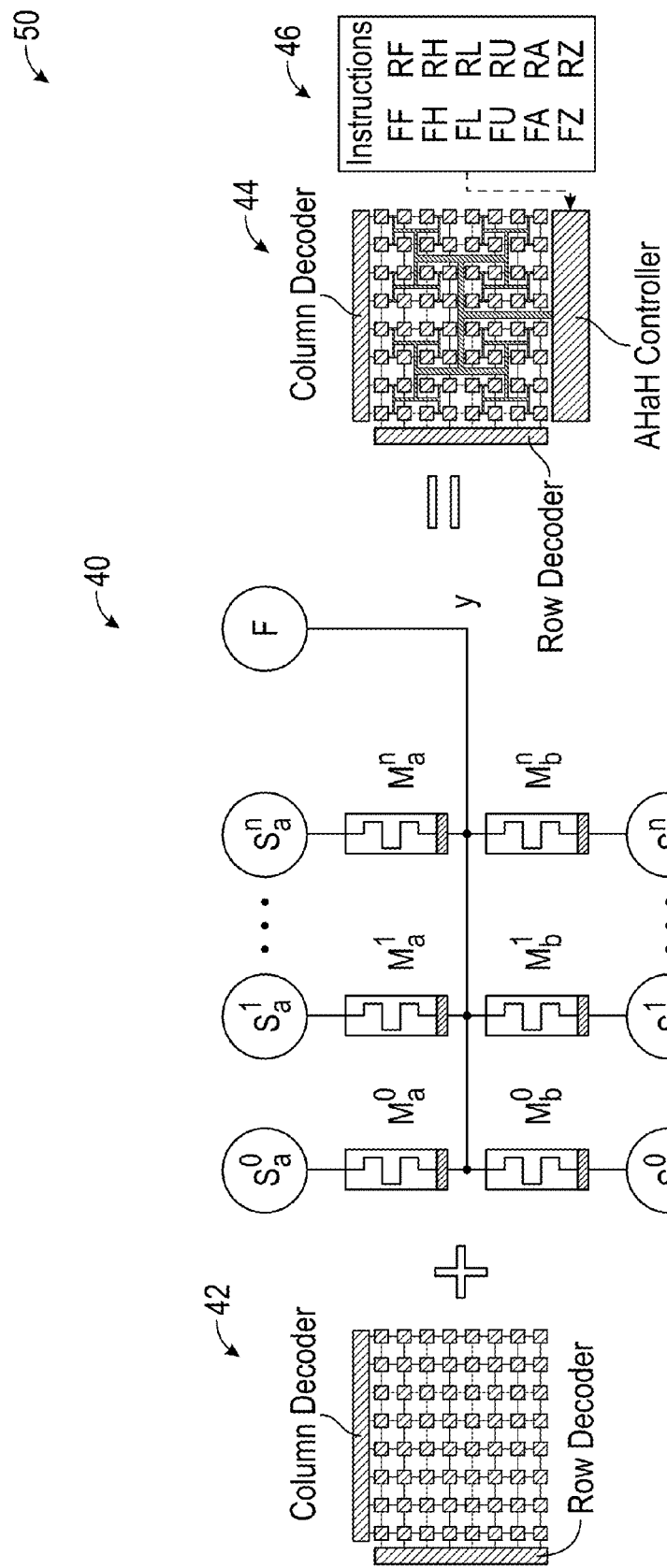
FIG. 5 illustrates a schematic diagram of an AHaH circuit with a RAM interface in accordance with a preferred embodiment.

FIG. 5 illustrates a schematic diagram of an AHaH circuit 50 that includes a RAM interface in accordance with a preferred embodiment. A circuit 42 is composed of column decoders and row decoders and combined with an AHaH Circuit 40 to form a kT-Core circuit 44 that includes an AHaH controller capable of execution of an instruction set 46.

kT-RAM provides a generic substrate from which any topology can be constructed. AHaH nodes can have as few or as many synapses as the application requires and can be connected in whatever way desired. This universality is possible because of a RAM interface and temporal partitioning or multiplexing.

The kT-Core exposes a simple instruction set describing the direction of applied bias voltage: forward (F) or reverse (R), as well as the applied feedback: float (F), high (H), low (L), unsupervised (U), anti-unsupervised (A), and Zero (Z). The kT-Core instruction set allows emulation with alternate or existing technologies, for example, with traditional digital processing techniques coupled to Flash memory, a program running on a CPU, or emerging platforms like Epiphany processors.

Figure 6:
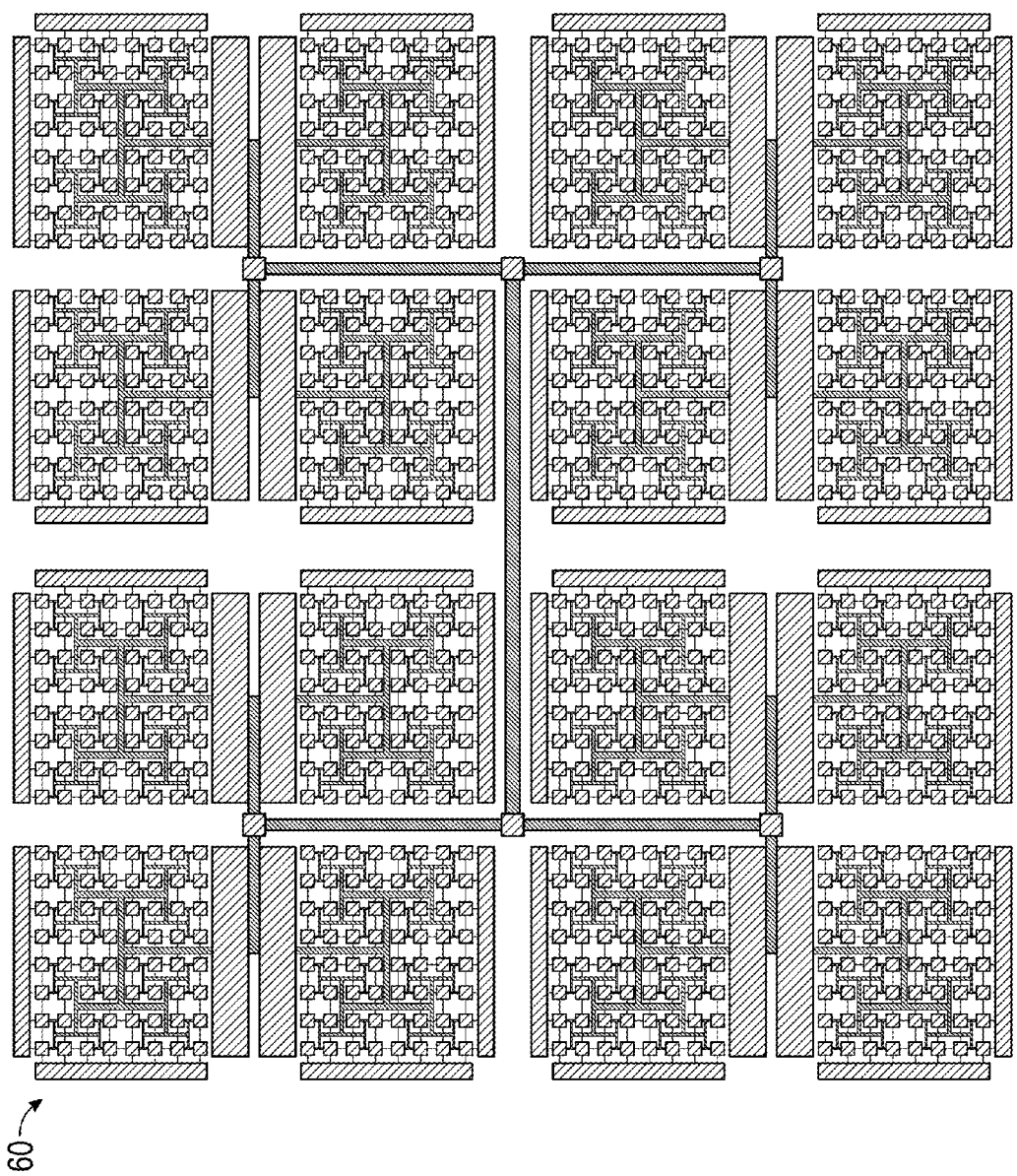
FIG. 6 illustrates a schematic diagram of a kT-Cores coming together to form kT-RAM, an adaptive computational resource for any requesting digital process, in accordance with a preferred embodiment.

FIG. 6 illustrates a schematic diagram of a circuit 60 based on kT-Cores coming together to form kT-RAM, an adaptive computational resource for any requesting digital process, in accordance with a preferred embodiment. The number of cores, and the way in which they are addressed and accessed, vary across implementations so as to be optimized for application areas kT-Cores can be partitioned into AHaH nodes of any size via time multiplexing. Cores can also couple their readout electrodes together to form a larger combined core. Physical AHaH node sizes can vary from just one synapse to the size of the kT-RAM chip, while digital coupling extends the maximal size to "the cloud", limited only by the cores intrinsic adaptation rates and chip-to-chip communication.

FIG. 7 illustrates kT-RAM instruction set 80 for an emulator that can allow developers to commence application development while remaining competitive with competing machine learning approaches, in accordance with an alternative embodiment.

Emulators allow developers to commence application development while remaining competitive with competing machine learning approaches. In other words, we can build a market for kT-RAM across all existing computing platforms while we simultaneously build the next generations of kT-RAM hardware.

Figure 8:
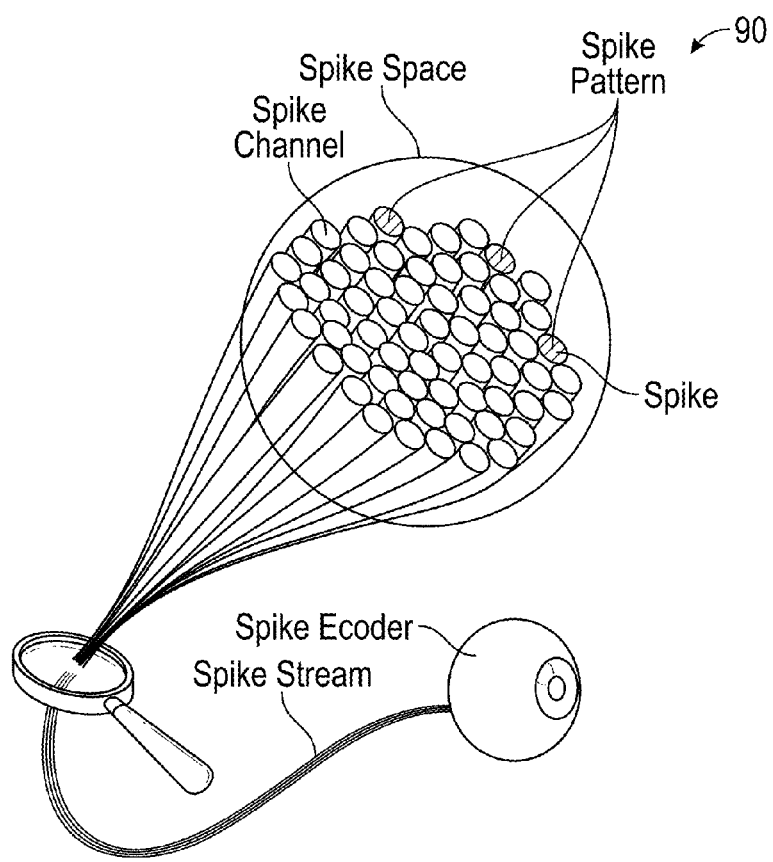
FIG. 8 illustrates an example spike encoder and related terminology.

FIG. 8 illustrates a representation of a spike encoding framework 90, in accordance with an alternative embodiment, There are many compelling motivations to use spikes. Spikes allow for core partitioning and multiplexing, which enable arbitrary AHaH node sizes. Sparse spikes codes are also very energy and bandwidth efficient. A spike framework such as framework 90 requires, for example, Spike Encoders (sensors), Spike Streams (wire bundle), Spike Channel (a wire), Spike Space (Number of Wires), Spike Sets (active spike channels), and finally Spikes (the state of being active).

Figure 9:
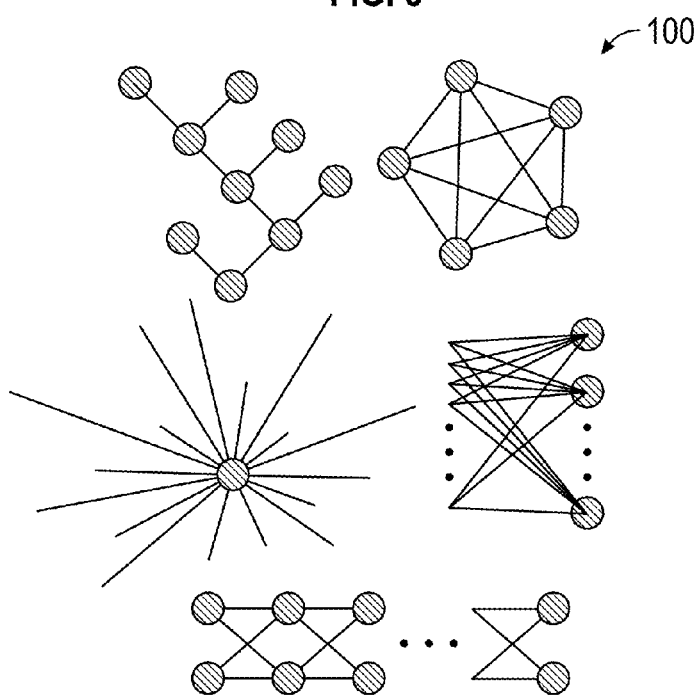
FIG. 9 illustrates a variety of network topologies of AHaH nodes possible with kT-RAM.

FIG. 9 illustrates a variety of AHaH node connection topologies. AHaH Computing is the theoretical space encompassing the capabilities of AHaH nodes. At this level of development, solutions have been found for problems as diverse as classification, prediction, anomaly detection, clustering, feature learning, actuation, combinatorial optimization, and universal logic. Just as modern computing is based on the concept of the 'bit' and quantum computing is based on the concept of the 'qubit', AHaH computing is built from the 'ahbit'. AHaH attractor states are a reflection of the underlying statistics of the data stream. It is both the collection of synapses and also the structure of the information that is being processed that together result in an AHaH attractor state. Hence, an 'ahbit' is what results when we couple information to energy dissipation.

Thus, in a preferred embodiment a thermodynamic RAM circuit can be implemented, which includes a collection of kT-Core circuits. Each kT-Core among the collection of core kT-Core circuits can include an AHaH circuit with a RAM interface. In another embodiment, an instruction set for a kT-Core learning circuit among the collection of kT-Core circuits can be implemented, which includes the following instructions: FF, FH, FL, FU, FA, FZ, RF, RH, RL, RU, RA, RZ. In yet another embodiment, at least one kT-RAM circuit can be implemented, which includes at least one kT-Core among the collection of the kT-Core circuits partitioned into AHaH nodes of any size via time multiplexing. In another embodiment, at least one kT-Core circuit among the collection of kT-Core circuits couples readout electrodes together to form a larger combined kT-Core among the collection of kT-Core circuits.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

The invention claimed is:

1. A thermodynamic RAM (Random Access Memory) circuit, comprising:
   a collection of kT (Thermodynamic)-Core circuits, wherein each kT-Core circuit among said collection of core kT-Core circuits comprises an AHaH (Anti-Hebbian and Hebbian) circuit, wherein at least one kT-Core circuit among said collection of kT-Core circuits couples readout electrodes together to form a larger combined kT-Core among said collection of kT-Core circuits.

2. The circuit of claim 1 further comprising an instruction set for a kT-Core learning circuit among said collection of kT-Core circuits.

3. The circuit of claim 2 further comprising at least one kT-RAM circuit that comprises at least one kT-Core circuit among said collection of said kT-Core circuits partitioned into AHaH nodes via temporal multiplexing.

4. The circuit of claim 1 further comprising at least one kT-RAM circuit that comprises at least one kT-Core circuit among said collection of said kT-Core circuits partitioned into AHaH nodes via temporal multiplexing.

5. The circuit of claim 1 wherein said AHaH circuit comprises an AHaH node circuit.

6. The circuit of claim 5 wherein said AHaH node circuit provides a universal computational and adaptation resource.

7. The circuit of claim 1 wherein said AHaH circuit is based on an AHaH node connection topology that provides for at least one of the following: classification, prediction, anomaly detection, clustering, feature learning, actuation, combinatorial optimization, and universal logic.

8. The circuit of claim 1 wherein said AHaH circuit comprises at least one memristor.

9. A thermodynamic RAM (Random Access Memory) circuit, comprising:
   a collection of kT (Thermodynamic)-Core circuits, wherein each kT-Core circuit among said collection of core kT-Core circuits comprises an AHaH (Anti-Hebbian and Hebbian) circuit, wherein at least one kT-Core circuit among said collection of kT-Core circuits couples readout electrodes together to form a larger combined kT-Core among said collection of kT-Core circuits, wherein said AHaH circuit comprises an AHaH node circuit, and wherein said AHaH node circuit provides a universal computational and adaptation resource.

10. The circuit of claim 9 wherein said AHaH circuit is based on an AHaH node connection topology that provides for at least one of the following: classification, prediction, anomaly detection, clustering, feature learning, actuation, combinatorial optimization, and universal logic.

11. The circuit of claim 9 further comprising an instruction set for a kT-Core learning circuit among said collection of kT-Core circuits.

12. The circuit of claim 9 further comprising at least one kT-RAM circuit that comprises at least one kT-Core circuit among said collection of said kT-Core circuits partitioned into AHaH nodes via temporal multiplexing.

13. The circuit of claim 9 wherein said AHaH circuit comprises an AHaH node circuit.

14. The circuit of claim 13 wherein said AHaH node circuit provides a universal computational and adaptation resource.

15. A thermodynamic RAM (Random Access Memory) circuit, comprising:
   a collection of kT (Thermodynamic)-Core circuits, wherein each kT-Core circuit among said collection of core kT-Core circuits comprises an AHaH (Anti-Hebbian and Hebbian) circuit, wherein at least one kT-Core circuit among said collection of kT-Core circuits couples readout electrodes together to form a larger combined kT-Core among said collection of kT-Core circuits and wherein said AHaH circuit comprises an AHaH node circuit.

16. The circuit of claim 15 wherein said AHaH node circuit provides a universal computational and adaptation resource.

17. The circuit of claim 15 wherein said AHaH circuit is based on an Allah node connection topology that provides for at least one of the following: classification, prediction, anomaly detection, clustering, feature learning, actuation, combinatorial optimization and universal logic.

\* \* \* \* \*